(12) United States Patent
Kotelnikov et al.

(10) Patent No.: US 9,851,556 B2
(45) Date of Patent: Dec. 26, 2017

(54) AVALANCHE PHOTODIODE BASED IMAGER WITH INCREASED FIELD-OF-VIEW

(71) Applicant: Princeton Lightwave, Inc., Cranbury, NJ (US)

(72) Inventors: Evgenii Yuryevich Kotelnikov, Princeton, NJ (US); Igor Kudryashov, Pennington, NJ (US); Samuel Richard Wilton, Hamilton, NJ (US); Sabbir Sajjad Rangwala, West Windsor, NJ (US)

(73) Assignee: Argo AI, LLC, Cranbury, NJ (US)

( * ) Notice: Subject to any disclaimer, the term of this patent is extended or adjusted under 35 U.S.C. 154(b) by 0 days.

(21) Appl. No.: 15/218,954

(22) Filed: Jul. 25, 2016

(65) Prior Publication Data

US 2017/0026556 A1 Jan. 26, 2017

Related U.S. Application Data

(60) Provisional application No. 62/196,495, filed on Jul. 24, 2015.

(51) Int. Cl.
*H04N 5/225* (2006.01)
*G02B 26/08* (2006.01)
*H04N 5/232* (2006.01)

(52) U.S. Cl.
CPC ....... *G02B 26/0833* (2013.01); *H04N 5/2259* (2013.01); *H04N 5/23238* (2013.01)

(58) Field of Classification Search
None
See application file for complete search history.

*Primary Examiner* — Stephen Coleman
(74) *Attorney, Agent, or Firm* — Kaplan Breyer Schwarz, LLP

(57) ABSTRACT

A GmAPD imager with an increased field of view includes at least one array of movable mirrors. Each movable mirror in the array switches between at least two positions (states). The movable mirrors receive light coming from a first direction when the mirror is in the first state and a second direction when the mirror is in the second state, thus increasing the field of view of the imager.

4 Claims, 5 Drawing Sheets

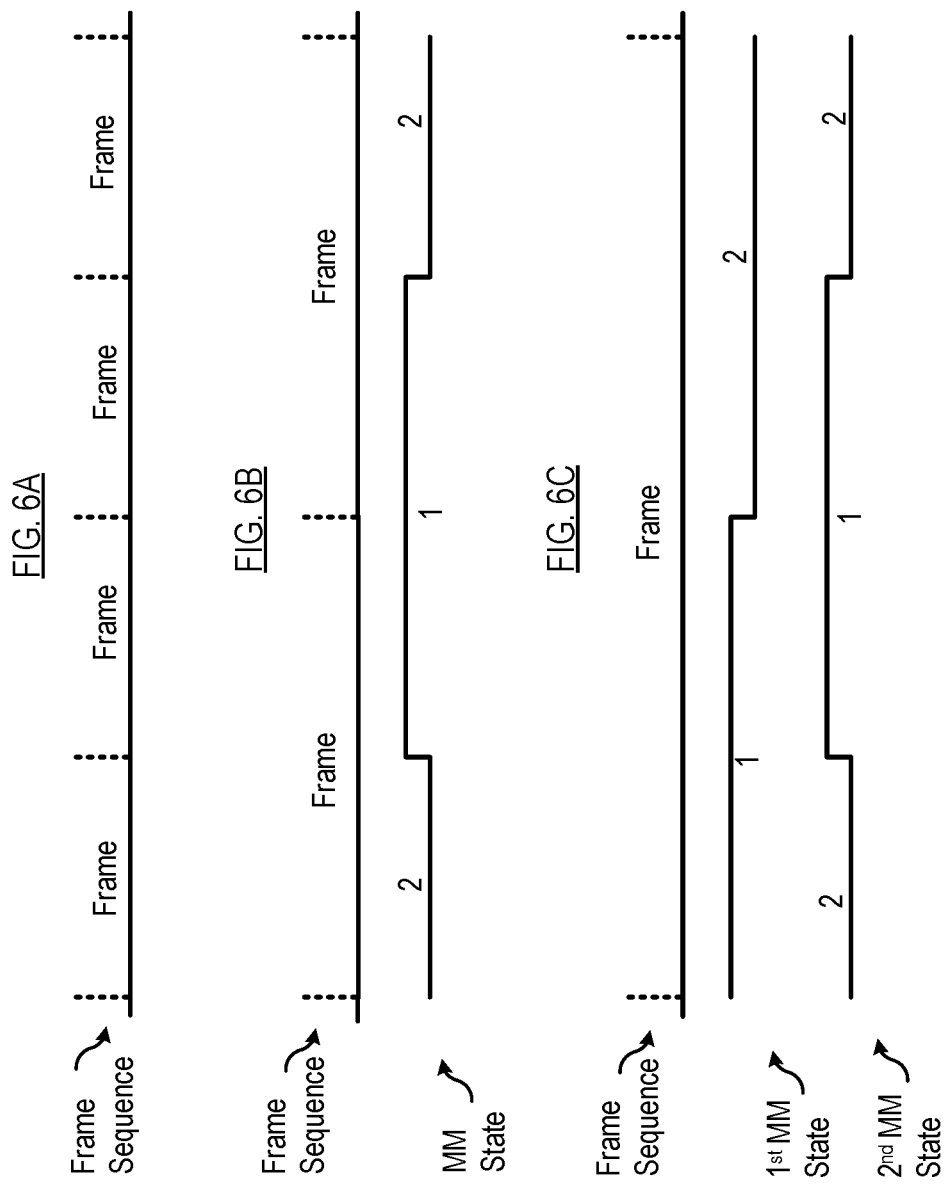

AVALANCHE PHOTODIODE BASED IMAGER WITH INCREASED FIELD-OF-VIEW

FIELD OF THE INVENTION

The present invention relates to imaging systems in general, and, more particularly, to single-photon imaging systems.

BACKGROUND OF THE INVENTION

The capture of high-quality imagery using reflected ambient light involves two fundamental challenges: (i) detection of optical intensities as low as a single photon, and (ii) detection over a wide dynamic range of optical intensities. To detect single photons with high fidelity (i.e., a high signal-to-noise ratio [SNR]), detectors must provide large electrical gain in the optical-to-electrical conversion process. In essentially all semiconductor photodetectors of visible and infrared light, each absorbed photon creates just a single free-carrier pair that includes one free electron and one free hole. Some prior-art technologies can achieve high gains by amplifying each single photo-excited carrier; for instance, image intensifier tubes exploit microchannel plates to obtain $10^4$-$10^6$ electrons for each incident photon. However, such large gains often give rise to saturation effects in the presence of larger optical input signals and can severely limit the dynamic range of such imagers.

Other prior-art technologies employ a much lower gain conversion process (often limited to unity gain) and obtain measurable output signals by integrating photo-excited charge for a sufficiently long period of time. These integration strategies often involve the collection of charge on a capacitive circuit element. Thermal fluctuations give rise to noise associated with electrons randomly moving on to and off of integration capacitors, and for practical (i.e., non-cryogenic) operating temperatures, these imagers have sensitivities limited to values well above the single-photon limit. Moreover, the finite size of these integration capacitors establishes a constraint on the dynamic range of the signals that can be recorded during each integration cycle.

The family of semiconductor photodetectors known as avalanche photodiodes (APDs) provides optical-to-electrical gain by exploiting carrier multiplication through the impact ionization process. An APD is designed so that photo-excited carriers induced in the absorption region of the device are injected into a multiplication region where they are accelerated by a large electric field. When an injected carrier reaches a sufficiently high kinetic energy, it can generate another free electron-hole pair through an inelastic collision with lattice atoms in a process referred to as "impact ionization." These newly liberated carriers are then accelerated, and the process continues to create an "avalanche" of charge until all carriers have exited the high-field multiplication region of the device.

At a sufficiently large electric-field intensity, known as the "avalanche breakdown field," there is a finite probability that the avalanche multiplication process can lead to a self-sustaining avalanche. By applying a field larger than the breakdown field, the APD is operated in a metastable state in which the injection of a single photo-excited charge can trigger the development of an easily detectable macroscopic pulse of charge in an extremely short (e.g., <1 ns) avalanche build-up period. This so-called "Geiger-mode" operation can provide high-efficiency detection of single photons, and devices operated in this regime are referred to as Geiger-mode avalanche diodes (GmAPDs).

GmAPDs have been used in each pixel of a focal-plane array (FPA) to create 2D passive imagers with single-photon sensitivity. GmAPD-based arrays have also been used for precise time-of-flight measurements in 3D LIDAR imaging.

State of the art GmAPD arrays are typically limited in the pixel formats (128×32, currently). Scaling is possible, but faces significant technology and cost challenges. The driver for scaling the pixel format is to achieve a greater field-of-view (FOV) for the array. The FOV achievable for a GmAPD array is constrained mainly by two factors. One factor is the required angular resolution per pixel, which in turn determines the image resolution per pixel. This is critical, for example, in LIDAR imaging applications wherein object recognition is for the purposes of obstacle avoidance and maneuvering. The other factor is an optical consideration. For GmAPD arrays, the active detection area is typically much smaller than the pixel pitch, which reduces fill factor. This is compensated for by using a micro-lens and then limiting the f-number of the focusing optics, which directly constrains the FOV.

As previously indicated, scaling to larger pixel formats will address these constraints. But presently, such scaling faces significant technological and cost factors.

SUMMARY OF THE INVENTION

Embodiments of the present invention increase the FOV of a GmAPD imager without scaling to larger pixel formats, thereby avoiding the drawbacks associated with that approach.

In accordance with the illustrative embodiment, an array of "digital micro mirror devices" (DMD) are used to enable a single GmAPD-based FPA to image two different FOVs as a consequence of the two different positions of the micro-mirrors of the DMD. A static mirror is used in conjunction with the DMD array to ensure that the two different FOVs overlap so that there are no "blind spots."

The DMD is a MEMS-based device that is capable of switching between two angular positions at very fast rates and is much more reliable than bulk scanning optics. A cost savings is realized via the use of a DMD array as opposed to scaling the pixel format. This is because the detector pixels are realized using indium phosphide-based (InP-based) process technology while the DMD is fabricated using conventional silicon-based process technology. Detector real estate is thus considerably more expensive than DMD real estate.

BRIEF DESCRIPTION OF THE DRAWINGS

FIG. 6A depicts the nominal frame sequence of a GmAPD-based camera with a "single" FOV.

FIG. 6B depicts the depicts frame sequence and mirror state for a GmAPD-based camera having a doubled FOV.

FIG. 6C depicts the depicts frame sequence and mirror state for a GmAPD-based camera having a quadrupled FOV.

DETAILED DESCRIPTION

Embodiments of the present invention can be used to increase the FOV of both 2D (passive imaging) and 3D (LIDAR) applications. And the method described herein applies to a single detector (i.e., a single GmAPD) as well as to an array of such detectors.

Figure 1:
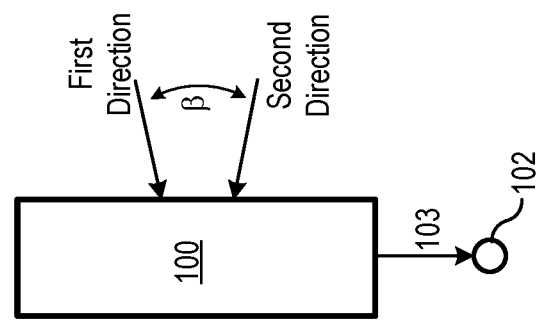
FIG. 1 depicts the use of a DMD array for switching the FOV of single pixel (single GmAPD) in accordance with an embodiment of the present invention.

FIG. 1 illustrates the basic concept of using a DMD to increase the FOV of a GmAPD-based pixel. FIG. 1 depicts optics 100 and pixel 102 (i.e., a single APD). Light 103 is directed from optics 100 to pixel 102.

Optics 100 includes both a DMD array as well as static optics (e.g., a fixed mirror). The DMD array, well known in the art, is an array of digital micro-mirror devices that are a part of the digital light processing (DLP) display device invented by Texas Instruments. Each DMD in the array is highly reflective aluminum micro-mirror. During operation, each mirror in the array is electrostatically deflected between two stable positions, at +12° and −12°. Although the illustrative embodiments incorporate DMD arrays, it should be understood that other mirror arrays having mirrors that are capable of switching between at least two positions may suitably be used.

Optics 100 switches the FOV of pixel 102 between a first direction and a second direction. The static optics adjust the angle β between the two directions, as necessary. In particular, angle β should be somewhat less than the FOV of a pixel (c.a. 1 milliradian) so that there will be image overlap when the FOV switches state. Without such overlap, there would be a "blind spot" in the resulting image. In addition, features in the overlap region provide information that can be used to "register" the two fields of view to form a composite image. The static optics are referred to as "static" because it does not move in the manner of the micro-mirrors in the DMD array during imaging operations. However, in some embodiments, the static optics can be adjustable, such as to change the positioning thereof with respect to the DMD array.

Figure 2:
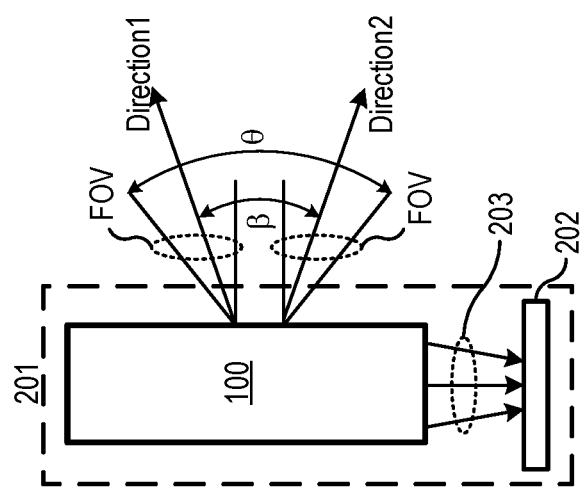
FIG. 2 depicts the use of a DMD array for switching the FOV of a GmAPD imager (camera) in accordance with an embodiment of the present invention.

FIG. 2 depicts a portion of GmAPD-based camera 201, including Optics 100 and GmAPD array 202. Optics 100 switches the FOV of the camera 201 between Direction1 and Direction2. Angle β between Direction1 and Direction2 should be somewhat less than the FOV of GmAPD array 202 (c.a. 8 degrees) to provide image overlap, as previously discussed. It is noted that in the Figures, the FOVs are depicted without overlap for clarity. Those skilled in the art will understand that there must be overlap between the switched FOVs to create an image without blind spots. Light 203 is directed from optics 100 to GmAPD array 202.

The resulting FOV θ for camera 201 is about twice that of GmAPD array; that is, about 16 degrees.

Figure 3:
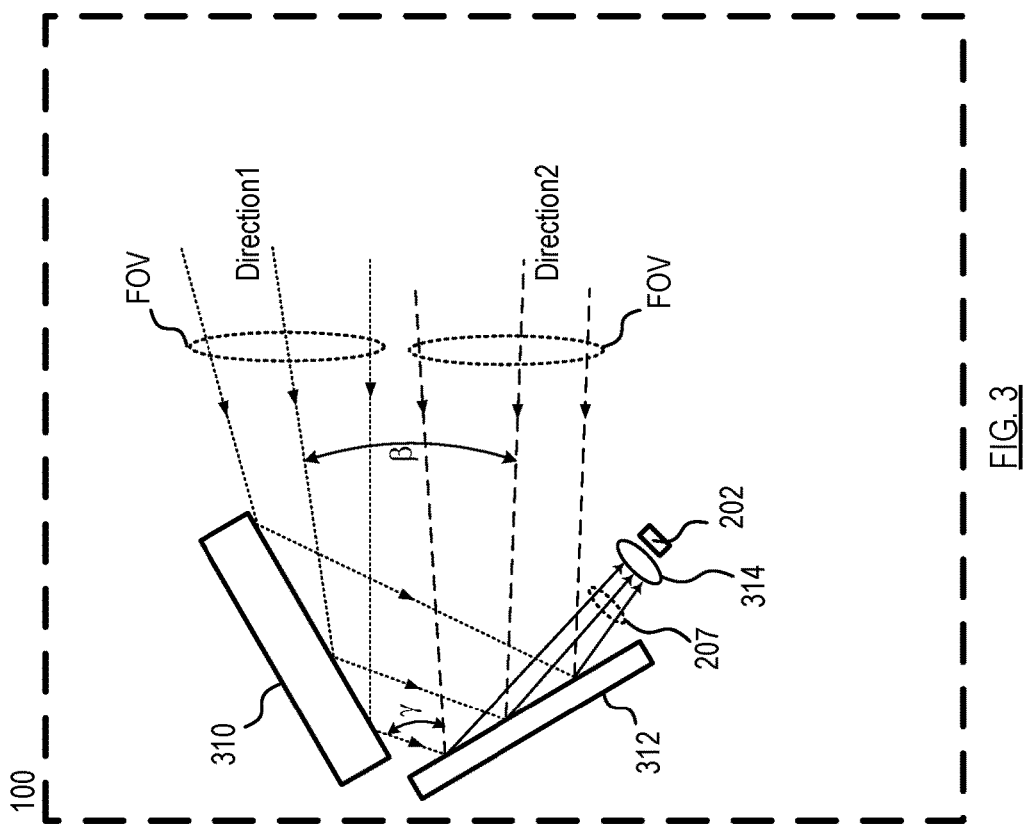
FIG. 3 depicts detail of an arrangement of the DMD array and static mirror in the camera of FIG. 2.

FIG. 3 depicts further detail of optics 100, which includes DMD array 312 and static mirror 310. As previously noted, the individual DMDs have two states (positions), and all DMDs in the array have same state. In a first state, mirrors in DMD array 312 are oriented to receive light (dotted lines) within FOV of GmAPD array 202 from Direction1. In the second state, mirrors in DMD array 312 are oriented to receive light (dashed lines) within FOV of GmAPD array 202 from Direction2. Micro-lens array 314 focuses the light from DMD array 312 onto individual pixels within GmAPD array 202.

As previously noted, the two states of the mirrors in DMD array 312 are +/−12 degrees. As a consequence, as between the two states, angle γ between the incoming beams at DMD array 312 is 24 degrees. Assuming GmAPD array 202 has an FOV of about 8 degrees, static mirror 310 must be appropriately positioned to ensure that angle β is somewhat less than 8 degrees.

Each micro-mirror in DMD array 312 is optically coupled to a single, unique GmAPD (i.e., pixel) in GmAPD array 202. Furthermore, multiple micro-mirrors in DMD array 312 can couple to a single, unique GmAPD. However, a micro-mirror in DMD array 312 will not be optically coupled to more than a single unique GmAPD.

Figure 4B:
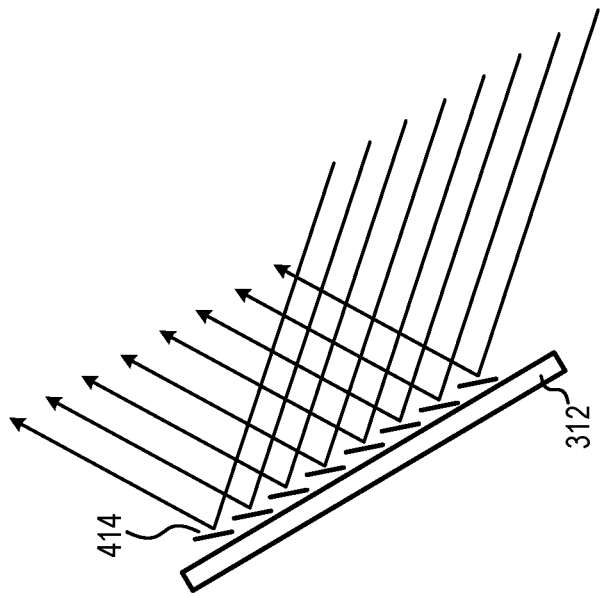
FIGS. 4A and 4B depict the operation of the DMD array.
Figure 4A:
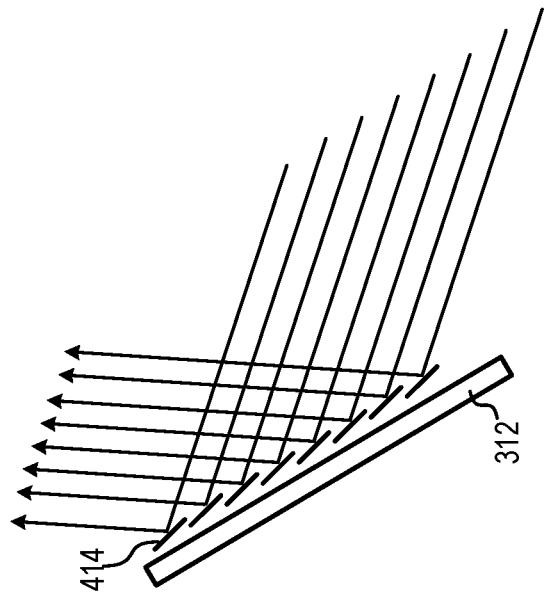

FIGS. 4A and 4B depict additional detail of DMD array 312, showing individual mirrors 414 in a first state (facing a first direction) in FIG. 4A and in a second state (facing a second direction) in FIG. 4B. As previously noted, without the presence of an additional static mirror, the angle between the rays in the first state and the second state is 24 degrees.

In the embodiment depicted in FIGS. 2 and 3, a single DMD array 312 and single static mirror 310 is used to effectively double the FOV of a GmAPD-based camera. Increasing the number of DMD arrays and static mirrors enables a further increase in the FOV of a GmAPD camera.

Figure 5:
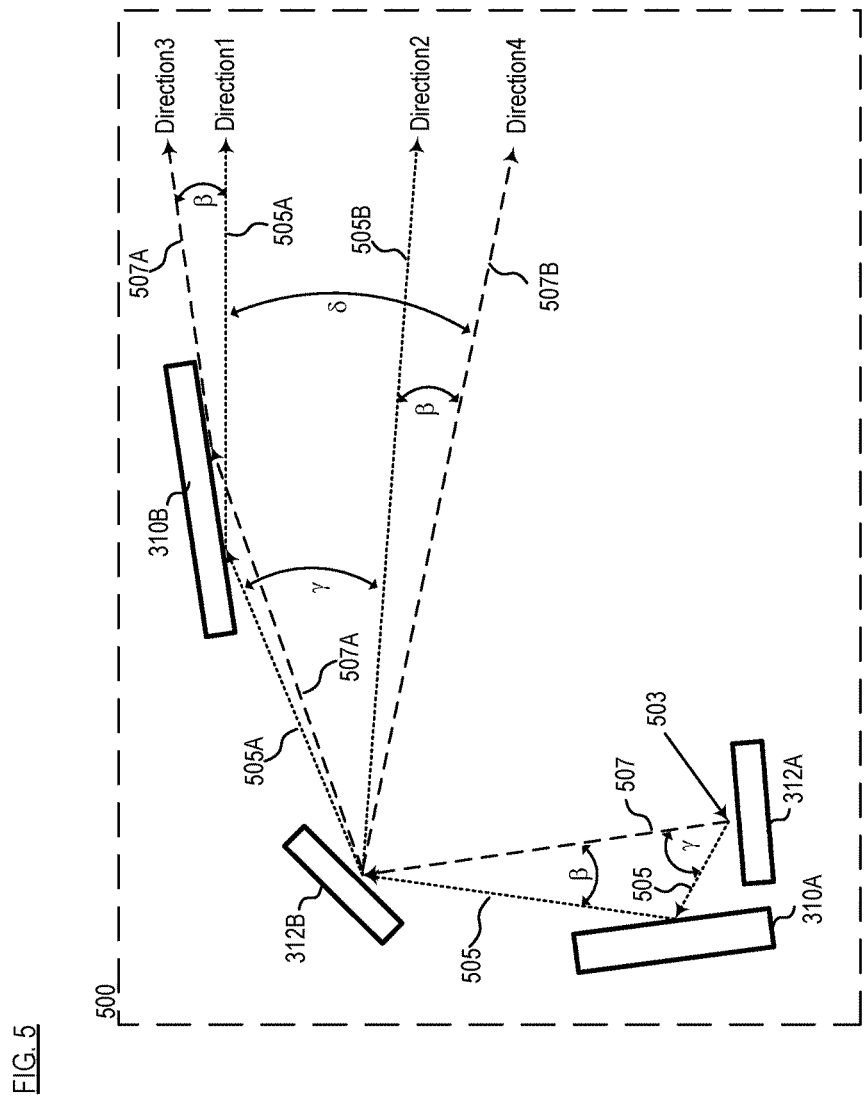
FIG. 5 depicts an arrangement wherein two DMD arrays are used to quadruple the FOV of a GmAPD camera in accordance with an embodiment of the present invention.

FIG. 5 depicts optics 500 for effectively quadrupling the FOV of a GmAPD-based camera. Optics 500 includes two DMD arrays 312A and 312B and two static mirrors 310A and 310B. The two DMD arrays collectively have four states, wherein each state is associated with a single direction for a total of four directions, thereby quadrupling the FOV.

For ease of explanation, the direction of light in FIG. 5 is based on using optics 500 as an output beam scanner, wherein a light source (not depicted) generates input beam 503. It will be appreciated that the ray tracing is the same in the opposite direction, wherein light is received by static mirror 310B and DMD array 312B and ultimately directed to a GmAPD array (not shown).

DMD array 312A can direct beam 503 into either one of two directions, based on the state of the DMD array. When DMD array 312A is in a first state, beam 505 (dotted line) is directed to static mirror 310A and then to DMD array 312B. When DMD array 312A is in a second state, beam 507 (dashed line) is directed to DMD array 312B. Angle γ between beam 505 and beam 507 is 24 degrees due to the design of the DMD array. Mirror 310A is positioned to reduce the 24-degree angle to beams 505 and 507 to 6 degrees (β=6 degrees) at DMD array 312B to ensure overlap between FOVs. Mirror 310A projects beam 505 onto the same point as beam 507 on DMD array 312B.

DMD array 312B thus operates with beams 505 and 507, directing each of those beams into either of two directions based on its state. In particular, with respect to beam 505, when DMD array 312B is in a first state, beam 505A is directed therefrom to static mirror 310B and reflects therefrom toward Direction1. When DMD array 312B is in a second state, beam 505B is directed therefrom toward Direction 2.

With respect to beam 507, when DMD array 312B is in a first state, beam 507A is directed therefrom to static mirror 310B and reflects therefrom toward Direction3. When DMD array 312B is in a second state, beam 507B is directed therefrom toward Direction 4.

Static mirror 310B is used to alter the direction of the beams 507A and 505A; in this embodiment to set an angular separation of 12 degrees between those beams and beams 505B and 507B (i.e., angle δ between Direction1 and Direction4 is 12 degrees). The result of that is that angle β between all adjacent directions (i.e., between Direction 3 and Direction1; between Direction 1 and Direction 2; and between Direction 2 and Direction 4) is 6 degrees, ensuring overlap of the FOVs.

Timing.

It will be appreciated that to double the FOV of an imager, such as the GmAPD imagers discussed herein, the movable micro-mirrors (e.g., the DMD, etc.) must switch between the two mirror positions at twice the frame rate of the imager. It will also be appreciated that assuming that resources are not being added, increasing the pixel "count" in a frame will necessarily decrease the frame rate. For example, given a 10×10 array of pixels, those pixels are normally each read out once during the course of a frame. If a DMD is being used to provide a doubled FOV, those same 100 pixels must each be read out twice—once in the first state (position) of the mirror and a second time in the second state of the mirror. Thus, the frame rate must be decreased by 50% to account for the two readouts of the pixels. Similarly, to quadruple the FOV, as with embodiment depicted in FIG. 5, the frame rate is decreased by a factor of four. The relationship between frame rate and mirror switching rate (or mirror position) is depicted in FIGS. 6A through 6C.

FIG. 6A depicts the nominal frame rate or sequence of the imager (i.e., a single FOV camera). The frame rate of a GmAPD-based array is typically about 100 Hz, such that frame duration is about 10 milliseconds. DMD switching is several orders of magnitude faster, with switching times of about a few microseconds.

FIG. 6B depicts frame sequence and mirror state for a GmAPD-based camera having a doubled FOV, such as by using one array of movable mirrors. Note that the frame rate of the imager has decreased by a factor of two to enable two readouts per frame: one readout at mirror position "2" and another readout at mirror position "1."

FIG. 6C depicts frame sequence and mirror state for a GmAPD-based camera having a quadrupled FOV, such as by using two arrays of movable mirrors (e.g., DMDs). In this embodiment, the frame rate of the imager has decreased by a factor of four to enable four readouts per imaging frame: one readout at mirror position "1" of the $1^{st}$ movable mirror, a second readout at mirror position "1" of the $2^{nd}$ movable mirror, a third readout out mirror position "2" of the $1^{st}$ movable mirror, and a fourth readout at the mirror position "2" of the $2^{nd}$ movable mirror. The four states (collectively) of the two movable mirrors enable the four directions depicted in FIG. 5.

The illustrative embodiments presented herein have used a "digital" micro-mirror (DMD), which provides two mirror positions. In some alternative embodiments, "analog" mirror arrays that can provide more than two mirror positions are used. In some such analog mirrors, a steady-state analog actuation voltage results in a steady-state analog angle of rotation of each micro-mirror. As such, within the range of "tilt" (i.e., $-x°$ to $+y°$ for the micro-mirror, any mirror position can be established via a particular actuating voltage. Those skilled in the art will know how to alter the optics (provide additional fixed mirrors, etc.) to accommodate the multiple mirror positions possible, so as to provide multiply the FOV as desired.

To focus on what is germane to the present invention, details concerning GmAPD imagers are not presented herein. Such information can be found, for example, in an article by Itlzer, et al., "Geiger-mode APD Single-Photon Cameras for 3D Laser Radar Imaging," 2014-Mar-IEEE-Aerospace-Conf. See, http://www.princetonlightwave.com/wp-content/uploads/2016/01/2014-Mar-IEEE-Aerospace-Conf_Itzler-GmAPD-LADAR-cameras.pdf. That article is incorporated herein by reference.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A device for increasing a field-of-view of an imager, the device comprising:
   an array of GmAPDs, the array having a field-of-view; and
   optics for switching the field-of-view of the array of GmAPDs from a first direction to a second direction, wherein the optics comprise:
   (a) a first array of micro-mirrors having a first state and a second state, wherein in the first state all micro-mirrors in the first array tilt in third direction and in the second state all micro-mirrors in the first array tilt in a fourth direction, wherein an angle subtended between the third and fourth directions is greater than the field-of-view of the array of GmAPDs; and
   (b) a first static mirror, wherein the first static mirror is positioned with respect to the first array of micro-mirrors so that a second angle subtended between the first direction and the second direction is less than the field-of-view of the array of GmAPDs.

2. The device of claim 1 further comprising a second array of micro-mirrors and a second static mirror.

3. The device of claim 1 and further wherein a micro-mirror in the first array thereof optically couples to a single GmAPD in the array thereof.

4. The device of claim 1 and further wherein a plurality of micro-mirrors in the first array thereof are optically coupled to a single GmAPD in the array thereof.

* * * * *